United States Patent [19]

Malafosse et al.

[11] Patent Number: 4,490,272

[45] Date of Patent: Dec. 25, 1984

[54] COMPOSITIONS WITH A POTASSIUM SUPEROXIDE BASE AND THEIR APPLICATIONS

[76] Inventors: Jean Malafosse, 3, rue Dewet, 71.100 Chalon-sur-Saone; Gérard Varlot, 67, rue de Corcelles, 71.530 Chalon-sur-Saone; Michel Pierre, 3, rue du Bois de Menuse, Saint Jean des Vignes, 71.100 Chalon-sur-Saone, all of France

[21] Appl. No.: 460,542

[22] Filed: Jan. 24, 1983

[30] Foreign Application Priority Data

Feb. 5, 1982 [FR] France ............................. 82 01844

[51] Int. Cl.$^3$ .............................................. C08K 3/18
[52] U.S. Cl. ................................ 252/181.3; 252/184; 422/120; 422/179; 128/200.26
[58] Field of Search ...................... 252/184, 181.3, 184; 422/120, 179; 128/200.26

[56] References Cited

U.S. PATENT DOCUMENTS

| 3,579,459 | 5/1971 | Porta et al. | 252/181.3 X |
| 3,702,305 | 11/1972 | Thompson | 252/186 |
| 3,847,837 | 11/1974 | Boryta | 252/184 X |
| 4,207,397 | 6/1980 | Davis et al. | 252/184 X |
| 4,361,493 | 11/1982 | Kiefer | 252/184 |

FOREIGN PATENT DOCUMENTS

| 2105933 | 4/1972 | France . |
| 671107 | 4/1952 | United Kingdom . |
| 1018751 | 6/1966 | United Kingdom . |

*Primary Examiner*—Lucille M. Phynes

[57] ABSTRACT

Potassium superperoxide compositions contain an additive product selected from the oxides of alkaline-earth metals and magnesium, particularly calcium oxide CaO, incorporated preferably in a concentration between 2 and 30% by weight, based on the weight of the total composition. These compositions of $KO_2$ are used to regenerate breathable atmospheres, particularly as regenerating charges in closed circuit individual rebreathing devices.

10 Claims, No Drawings

COMPOSITIONS WITH A POTASSIUM SUPEROXIDE BASE AND THEIR APPLICATIONS

FIELD OF INVENTION

This invention relates to compositions with a potassium superoxide base and their applications to the regeneration of breathable atmospheres.

BACKGROUND

Potassium superoxide is a product particularly well suited for the regeneration of a breathable atmosphere because it has the characteristic of fixing carbon dioxide gas and water vapor and releasing oxygen according to the reactions:

$$2KO_2 + CO_2 \; K_2CO_3 + \tfrac{3}{2} O_2 \quad (1)$$

$$2KO_2 + H_2O \; 2KOH + \tfrac{3}{2} O_2 \quad (2)$$

This characteristic is used to make atmosphere regenerators having closed chambers and respiratory apparatus which operate in a closed circuit.

Breathing apparatus essentially consist of a cartridge, for example a metal box, in which the superoxide is placed, and a lung bag, these two elements being connected to each other and to the user of the apparatus in such a way that the exhaled gas goes through the superoxide leaving there most of the carbon dioxide gas and a large part of the water vapor, whereby this becomes enriched with oxygen; this gas is stored in the lung bag from which the user inhales the regenerated air.

As this apparatus must be carried by the user, the best compromise between total weight of the apparatus and endurance must be obtained. For a given respiratory level, this compromise is all the more difficult to achieve the shorter the endurance of the apparatus and, consequently, the lower the potassium superoxide charge. Actually, when the carrier of the apparatus makes a sustained effort, corresponding to a work of 100 to 200 watts, for example, the biological consumption of oxygen is between 1.2 and 1.5 l/min. and the $CO_2$ rejected is between 1 and 1.35 l/min. for a respiratory quotient of 0.90. The respiratory output is between 30 and 35 l/min.

When the superoxide charge decreases, the reactive level imposed on the charge increases and the utilization rate of the superoxide tends then to decrease, unless its reactivity is increased; but the reactivity is limited, on the one hand, by the reaction of the superoxide to temperature and, on the other hand, by chemical exchanges between the gas and the superoxide.

An apparatus is generally designed to meet the respiratory needs of a man performing a given level of effort for a well determined period.

Therefore, for each apparatus, the minimum weight of superoxide corresponding to a maximum utilization rate is sought, which involves correlating as well as possible the following parameters: reactivity of the superoxide, its reaction to temperature, thickness and shape of superoxide pellets and structure of the superoxide charge.

If it is desired to keep the weight and the dimensions of the apparatus within tolerable limits, it is necessary that the superoxide charge be used as completely as possible, yet without the content of $CO_2$ of the gas inhaled exceeding 1.5% or the pressure to be exerted upon exhalation becoming greater than 6.5 millibars.

Several partial solutions have been suggested and even used in existing rebreathing devices. To obtain the best efficiency for oxygen generation, a catalyst is added, as for example, a cation that derives from transition metals, generally the cation $CU^{++}$.

No matter what the method of manufacturing the potassium superoxide, it is first transformed into very fine powder form. According to one process, some metallic potassium is burned in a chamber containing superoxygenated air; then $KO_2$ in the form of very light flakes is obtained which are then brought together, after adding the catalyst, in fragments of rather hetergeneous compositions, sizes and shapes.

In the process described in French Pat. No. 2,175,652, hydrogen peroxide and potash are made to react to provide a peroxide solution on which a dismutation is performed on the warm outer surface of a horizontal cylinder, turning around its axis; then the potassium superoxide is collected in the form of flakes by scraping the surface of the cylinder. The product thus manufactured contains about 80 to 85% $KO_2$, 12 to 15% $KOH$, 2 to 5% $H_2O$. After adding copperoxychloride, it is very easily put in the shape of pellets by processing in a rotating compression machine, which makes possible a packaging of the particles with a homogeneous and rigorous controlled porosity, composition and shape.

However, these various agglomeration processes are not sufficient to assure, in the case of intensive use of the regenerating charge, a stability or a sufficiently low increase of the pressure drop at exhalation, which is compatible with prolonged use of the breathing apparatus and a high utilization rate of the potassium superoxide.

Actually, the strong exothermic nature of the reactions (1) and (2) induce considerable heating within the $KO_2$ charge. In the heart of the regenerating charge, the pellets or agglomerates become destroyed and transformed into a more or less viscous bulk which resists the passage of the gas by clogging passageways therethrough, creating a very considerable rise in the pressure drop; alternatively preferential paths are formed which reduce the rate of fixation of $CO_2$ whose content in the inhaled gas too quickly becomes greater than the tolerable threshold.

An effort has been made to eliminate these drawbacks by giving the cartridge such a structure that the gas goes through only a small thickness of superoxide at low speed, or by separating the charge into small fractions by metal partitions which come in contact with the wall and thus, have a heat exchange function; thus, complex structures result in which the weight of non-reactive matter is relatively significant. These complex structures have a high production cost and filling them is rather difficult and does not lend itself well to automation.

SUMMARY

Now, a means has been found that makes it possible to eliminate the excessive increase of pressure drops of the potassium superoxide during intensive regeneration conditions, thus mastering a problem that has heretofore remained without a solution for more than ten years. Moreover, this product is adaptable to very simple structures for the regenerating charges of potassium superoxide. Based on this discovery, cartridges for rebreathing devices can be made with a simple structure, with no interior arrangement and in which all the volume and weight are used for the superperoxide or the like reagent.

Actually, it has been found that the addition to the superoxide of products which have a chemical function that can be used for the purpose of carbon dioxide fixation and which, although hydroscopic, do not give, under reaction conditions, derivatives with low melting points, makes it possible to provide mixtures for which the drawbacks and use limits described above are very considerably reduced.

DETAILED DESCRIPTION OF EMBODIMENTS

According to the invention, among the products reactive with carbon dioxide, an oxide of an alkaline-earth metal or magnesium is selected as an additive to the potassium superoxide. It is advantageous to incorporate the additive at a concentration between 2 and 30% by weight in relation to the total mixture.

An additive product particularly suited to the means according to the invention is calcium oxide: CaO, more commonly called lime. The proportion of lime in relation to the total mixture can vary between 2 and 30%, preferably between 5 and 15% by weight.

These compositions with a base of potassium superoxide are obtained by mixing in the powder state potassium superoxide, optionally a catalyst and some lime, in a powder mixer of ordinary type, such as a V mixer or a helical movement apparatus. A batch of lime of particle size at most equal to that of the potassium superoxide is selected. Then the compositions thus prepared are processed on an industrial rotating pelleting machine, to package them in the form of homogeneous and regular agglomerates, such as pellets.

According to the type of regeneration cartridge selected and the operating conditions, there must be used a homogeneous regenerating charge of pellets all having the same content of additive, or else a homogeneous mixture of potassium superoxide pellets dispersed in the potassium superoxide pellets with the additive. These $KO_2$ pellet mixtures can have variable lime contents, the proportion of potassium superoxide pellets containing the additive being from 50 to 95% by weight, preferably 60 to 90%.

It has been observed that sometimes there is an advantage in using $KO_2$ pellet mixtures in which the majority of pellets will have a relatively high content of additive and the other part will have a zero or slight content of additive product. Thus, it is possible to provide regenerating charges consisting of an alternating succession of natural homogeneous layers, each layer being composed either of potassium superoxide pellets, or of potassium superoxide pellets with the additive according to the invention. In the regenerating charges, the layers can be superposed or juxtaposed.

Examples which illustrate the invention in a nonlimiting way are given below.

The test apparatus consists of a so-called artifical lung marketed by AUER company; it consists of a large cylinder in which a membrane works whose alternating movement and an appropriate set of valves assures a constant pulsed flow within the circuit. Two other smaller cylinders, provided with membranes whose movements are mechanically under the control of the movement of the main membrane are connected to it; one of these cylinders, connected to a bottle of carbon dioxide, introduces into the main flow a constant volume of $CO_2$ at each pulsation; the other cylinder withdraws from it to the outside a volume of mixture equal to the volume $CO_2$ introduced. The air-$CO_2$ mixture then bubbles in a container of water whose temperature is adjustable, then goes through the tested cartridge. The processed gas is collected in a respiratory bag connected to the large cylinder of the "AUER" respirator. An aliquot part of the gas is sampled after passing through the cartridge and sent, after drying, over an oximeter (analysis by paramagnetism) and a $CO_2$ analyzer (infrared cell) and then it is returned to the main circuit; a pressure sensor is placed parallel between the intake and output of the cartridge and measures the variation of pressure drop of the cartridge.

All this data is recorded as a function of time.

The endurance measured in minutes in the examples below is determined by one and/or the other of the two limits:

the time beyond which the pressure drop of the cartridge becomes greater than 5 millibars. The pressure drop is designated by the symbol "$\Delta P$".

the time beyond which the content of $CO_2$ in the effluent gas exceeds 1.5%.

Oxygen generation often exceeds the volume of fixed $CO_2$ and the volume of the circuit is kept constant by extracting the excess gas by a calibrated valve placed on the respiratory bag; in some cases, this excess is measured by a gas counter placed behind the valve.

The experimental cartridges used are of the radial and axial types. In the radial cartridge the superoxide is placed in a cylindrical crown; the gas enters the central cylinder of perforated sheet metal, goes through the superoxide and is collected at the periphery; in this cartridge the speed of the gas in the solid layer—all other things being equal—is constantly decreasing. In the axial cartridge the superoxide is placed in a parallelepipedal box the gas arrives at the base of the cartridge by an unpierced central tube in a chamber whose ceiling is a perforated sheet supporting the superoxide; the gas is gathered at the top, (on the other side) of the layer; in this case, the speed of the gas in the layer of pellets is constant, all other things remaining equal.

All the tests described in the examples below are performed on charges composed of double-convex pellets with diameter 9 mm; thickness 4.5 mm; and thickness of the middle cylindrical part 2 mm. The porosity deduced from the weight and the volume of the pellets and from the true density of the powder is about 45%. All the charges are packed by vibration.

EXAMPLE 1

A reagent mixture of 10% to used having the following chemical composition:

| $KO_2$ %: 73.8 | KOH %: 13.3 | |
| CaO %: 10 | $H_2O$ %: 2.4 | $Cu^{++}$: 0.15% |

1600 g of this mixture are placed in a parallelepipedal box whose useful cross-sectional area is about 139 cm$^2$; the height of the bed is about 16 cm. The "AUER" respirator is adjusted in such a way that the average flow of gas is about 30 l/min. (measured at 22° C.) at a rate of 20 pulsations per minute; the gas contains 4.3–4.5% $CO_2$; it is brought to 34°–35° C. before entering the cartridge and its relative humidity at this temperature is greater than 94%. The end of endurance is caused by the pressure drop which reaches 5 millibars after 104 min. of operation. The content of $CO_2$ in the processed gas remains zero until the 75th minute, then gradually rises to reach 1% at the 100th minute; its increase is then rather rapid, i.e. 0.12% per minute. The generation of oxygen is about 1 liter per minute at the end of endurance and the utilization rate of the superoxide is about 90%.

EXAMPLE 2

Example 1 is repeated on the same product and under the same conditions. An endurance of 103 minutes is measured, at the end of which time the content of $CO_2$ in the processed gas is about 1.5%; at the same time the pressure drop is about 3.3 millibars, but its increase is rapid, i.e. about 0.3 millibars per minute.

EXAMPLE 3

Example 1 is repeated on the same product, but only 1500 g of product are used; the height of the bed is then about 15 cm. The end of endurance after 87 minutes of operation is caused by the content of $CO_2$; the pressure drop is only about 2 millibars and the amount of oxygen generated is greater than 1 liter/min.

EXAMPLE 4

Example 1 is repeated while reducing the gas flow to 26 l/mn instead of 30 l/mn. An endurance of 114 min. is measured; its end is caused by the pressure drop and the content of $CO_2$ at the end of endurance is about 1%, the generation of oxygen being on the order of 1 liter/min.

EXAMPLE 5

Example 1 is repeated while increasing the gas flow to 35 l/min.; the end of endurance after 84 min. is due to the $CO_2$ content, but the pressure drop of 3.3 mbars rapidly increases; the generation of oxygen is on the order of 1.2 liters per minute.

EXAMPLE 6

The operation is performed at 26 l/min. on 1500 g of mixture having the following composition:

| $KO_2$: 74.1% | CaO: 8% | |
|---|---|---|
| KOH: 13.4% | $H_2O$: 2.5% | $Cu^{++}$: 0.15% |

The other test conditions are those of example 1; the end of endurance after 111 min. is caused by the $CO_2$ content; at that time the pressure drop is about 2.5 millibars.

EXAMPLE 7

Control test on a product that does not contain lime and that has the following composition:
$KO_2$ 81.2%; KOH 15.8%; $H_2O$ 3.0%; $Cu^{++}$ 0.15%.
The operation is performed on a charge of 1500 g with a gas flow of 30 l/min.; the other test conditions are those of example 1; the end of endurance is reached in 38 min. because of the pressure drop; the content of $CO_2$ from the processed gas is zero, but the utilization rate of the superoxide deduced from the generation of oxygen is only about 32%.

EXAMPLE 8

Second control test. The operation is performed on the same product and under the same conditions as in example 7, but at 26 l/min. An endurance limited to 45 min. is measured because of the increase of the pressure drop; the amount of $CO_2$ of the processed gas is zero.

EXAMPLE 9

Examination of the contents of the cartridges after tests 7 and 8 shows that only a small portion of the charge placed at the level of the attack of the gas has reacted; it has become blackish; the pellet structure has disappeared to give way to a compact and homogeneous mixture that exhibit a stronger resistance to the passage of the gas. Above this crust, which represents less than a fourth of the contents of the cartridge, is found the rest of the charge in the shape of pellets flowing freely and that have kept their initial yellow color. On the other hand, in examples 1 to 6, the contents of the cartridge after testing has a very different aspect. For the most part, it consists of an agglomerate of pellets stuck together but having kept their initial shape; they are black on the surface and white or gray on the inside and each forms a very porous and friable unit that exhibits little resistance to the passage of the gas; yellow product is no longer distinguishable which shows that all the superoxide has entered into reaction.

EXAMPLE 10—radial cartridge

It consists of two concentric cylinders of perforated sheet metal (holes about 1 mm) with a diameters of 165 and 55 mm; the charge of 1500 g of mixture with a superoxide base is placed in the cylindrical crown made by these two cylinders and held at the top and the bottom by two disks of solid sheet; it is separated into 5 fractions of 300 g by disks of perforated sheet. The gas enters through the inner cylinder, is diffused in the charge by the holes of the charge and is collected at the periphery; the thickness of the superoxide through which the gas passes is about 5.5 cm.

The products used in these tests are as follows:

| | |
|---|---|
| 1: | product without addition of lime similar to that of Example 7 |
| 2: | 8% CaO mixture like Example 6 |
| 3: | 10% CaO mixture like Example 1 |
| 4: | mixture of pellets: 78% contain 8% CaO |
| | 22% contain no lime |
| 5: | mixture of pellets: 88% contain 10% CaO |
| | 17% do not contain any lime |
| 6: | mixture of pellets: 75% contain 12% CaO |
| | 25% do not contain any lime |
| 7: | mixture of pellets: 70% contain 12% CaO |
| | 30% do not contain any lime |
| 8: | mixture of pellets: 65% contain 15% CaO |
| | 35% do not contain any lime |

The tests of the table below are performed with an overall gas flow of 35 l/min., at 20 pulsations per minute; the gas contains 4.5 to 4.8% $CO_2$ and is saturated with moisture at 35°–37° C. The measure of the endurance is made according to the same criteria as in the previous examples.

| | Endurance time in minutes | Cause of the end of endurance | Value of the other criterion |
|---|---|---|---|
| 1 | 43–48 | ΔP | $CO_2$: 0.8–1.4% |
| 2 | 33 | $CO_2$ | constant ΔP 4 mbars |
| 3 | 23 | $CO_2$ | constant ΔP 3 mbars |
| 4 | 72 | $CO_2$ | constant ΔP 3 mbars |
| 5 | 71 | $CO_2$ | constant ΔP 3.7 mbars |
| 6 | 84 | $CO_2$ | constant ΔP 3 mbars |
| 7 | 87 | $CO_2$ | constant ΔP 3.7 mbars |

| Endurance time in minutes | Cause of the end of endurance | Value of the other criterion |
|---|---|---|
| 8 | 80 | $CO_2$ | constant $\Delta P$ 3.5 mbars |

These tests show that under these conditions the product that does not contain any additive other than the catalyst does not make it possible to obtain a utilization time greater than about 45 minutes, because of a too rapid increase of the pressure drop of the reactive bed. The mixtures with lime added, used alone, are not reactive enough with respect to the carbon dioxide; the thickness of the bed through which the gas passes is insufficient. The endurance time is almost doubled by dispersing, in a homogeneous manner, pellets that do not contain calcium oxide in pellets with a relatively high calcium oxide content.

It is to be understood that the invention is not limited to the embodiments disclosed which are illustratively offered and that modifications may be made without departing from the invention.

What is claimed is:

1. Composition with a potassium superoxide base characterized by the addition to the potassium superoxide of an oxide of an alkaline-earth metal or magnesium incorporated in a concentration between 2 and 30% by weight in relation to the total mixture.

2. Composition with a potassium superoxide base as in claim 1, wherein the additive product is calcium oxide CaO.

3. Composition with a potassium superoxide base as in claim 1, wherein the additive product is incorporated in a concentration between 5 and 15% by weight in relation to the total mixture.

4. In a closed-chamber atmosphere regenerator or a cartridge for respiratory apparatus which operates in a closed circuit with an axial or radial structure, containing a potassium superoxide base reagent packaged by compression in the shape of regular and homogeneous agglomerates, such as pellets, as in claim 1.

5. Regenerating charges with a potassium superoxide base characterized by a homogeneous mixture of potassium superoxide pellets dispersed in pellets with an additive as in claim 1.

6. Regenerating charges as in claim 5, wherein the proportion of pellets with the additive is between 50 and 95% by weight.

7. Regenerating charges as in claim 6, wherein the proportion of pellets with the additive is between 60 and 90% by weight.

8. Regenerating charges with a potassium superoxide base characterised by an alternating succession of layers of a homogeneous nature, one layer being composed of potassium superoxide and adjacent layers of potassium superoxide with the additive as in claim 1.

9. Regenerating charges with a potassium superoxide base as in claim 8, wherein the layers are superposed.

10. Regenerating charges with a potassium superoxide base as in claim 8, wherein the layers are juxtaposed.

* * * * *